(12) United States Patent
Gunn, III et al.

(10) Patent No.: US 7,085,443 B1
(45) Date of Patent: Aug. 1, 2006

(54) DOPING PROFILES IN PN DIODE OPTICAL MODULATORS

(75) Inventors: Lawrence C. Gunn, III, Encinitas, CA (US); Roger Koumans, Irvine, CA (US); Bing Li, San Diego, CA (US); Guo Liang Li, San Diego, CA (US); Thierry J. Pinguet, Cardif-by-the-Sea, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

(21) Appl. No.: 10/916,857

(22) Filed: Aug. 11, 2004
(Under 37 CFR 1.47)

Related U.S. Application Data

(60) Provisional application No. 60/495,402, filed on Aug. 15, 2003, provisional application No. 60/495,403, filed on Aug. 15, 2003, provisional application No. 60/495,404, filed on Aug. 15, 2003.

(51) Int. Cl.
*G02F 1/035* (2006.01)
*G02B 6/12* (2006.01)

(52) U.S. Cl. .............................. 385/14; 385/3; 385/40; 359/245

(58) Field of Classification Search ..................... None
See application file for complete search history.

(56) References Cited

U.S. PATENT DOCUMENTS

| | | | | | |
|---|---|---|---|---|---|
| 3,611,207 | A | * | 10/1971 | Klahr | 359/248 |
| 6,298,177 | B1 | * | 10/2001 | House | 385/3 |
| 6,383,868 | B1 | * | 5/2002 | Parekh et al. | 438/253 |
| 6,845,198 | B1 | * | 1/2005 | Montgomery et al. | 385/50 |
| 2005/0179986 | A1 | * | 8/2005 | Gothoskar et al. | 359/321 |

* cited by examiner

*Primary Examiner*—John D. Lee
*Assistant Examiner*—Omar Rojas
(74) *Attorney, Agent, or Firm*—Fernandez & Associates, LLP

(57) ABSTRACT

High speed optical modulators can be made of a lateral PN diode formed in a silicon optical waveguide, disposed on a SOI or other silicon based substrate. A PN junction is formed at the boundary of the P and N doped regions. The depletion region at the PN junction overlaps with the center of a guided optical mode propagating through the waveguide. Electrically modulating a lateral PN diode causes a phase shift in an optical wave propagating through the waveguide. Each of the doped regions can have a stepped or gradient doping profile within it or several doped sections with different doping concentrations. Forming the doped regions of a PN diode modulator with stepped or gradient doping profiles can optimize the trade off between the series resistance of the PN diode and the optical loss in the center of the waveguide due to the presence of dopants.

19 Claims, 7 Drawing Sheets

DOPING PROFILES IN PN DIODE OPTICAL MODULATORS

CROSS-REFERENCE TO RELATED APPLICATIONS

This application claims priority from U.S. Provisional applications No. 60/495,402, No. 60/495,403 and No. 60/495,404 filed Aug. 15, 2003. This application is related to U.S. patent applications entitled: "PN Diode Optical Modulators Fabricated In Rib Waveguides," Ser. No. 10/917,204 "PN Diode Optical Modulators Fabricated In Strip Loaded Waveguides" Ser. No. 10/916,839 and "PN Diode Optical Modulators With Variegated PN Junctions," Ser. No. 10/917,430 which are to be filed on the same date as this application.

FIELD OF THE INVENTION

The present invention relates to optical modulators for use in optoelectronic integrated circuits.

BACKGROUND OF THE INVENTION

Optical fibers have been widely used for the propagation of optical signals, especially to provide high speed communications links. Optical links using fiber optics have many advantages compared to electrical links: large bandwidth, high noise immunity, reduced power dissipation and minimal crosstalk. Fiber optic communications links can operate with carrier frequencies in the THz range. In communications systems where optical fibers are used to transport optical communications signals, various optoelectronic devices are used to control, modify and process the optical signals.

An integrated optical modulator is a key component of an optical communications system. An optical modulator uses an electrical signal to modulate some property of an optical wave, like the phase or the amplitude. A modulated optical wave can be sent on a fiber optic link or processed by other optical or optoelectronic devices.

Integrated optoelectronic devices made of silicon are highly desirable since they can be fabricated in the same foundries used to make VLSI integrated circuits. Optoelectronic devices integrated with their associated electronic circuits can eliminate the need for more expensive hybrid optoelectronic circuits. Optoelectronic devices built using a standard CMOS process have many advantages, such as: high yields, low fabrication costs and continuous process improvements.

Previously fabricated silicon-based PIN diode optical modulators have been designed for integrated silicon waveguides with large cross sectional dimensions on the order of several microns. These large modulators are relatively low speed devices capable of modulation at rates in the tens of megahertz, and such low speed devices are not suitable for use in high speed GHz rate systems.

SUMMARY OF THE INVENTION

High speed optical modulators can be made of a lateral PN diode formed in a silicon optical waveguide, disposed on a SOI or other silicon based substrate. A PN junction is formed at the boundary of the P and N doped regions. The depletion region at the PN junction overlaps with the center of a guided optical mode propagating through the waveguide. Electrically modulating a lateral PN diode causes a phase shift in an optical wave propagating through the waveguide. Each of the doped regions can have a stepped or gradient doping profile within it or several doped sections with different doping concentrations. Forming the doped regions of a PN diode modulator with stepped or gradient doping profiles can optimize the trade off between the series resistance of the PN diode and the optical loss in the center of the waveguide due to the presence of dopants.

DETAILED DESCRIPTION

Figure 1:
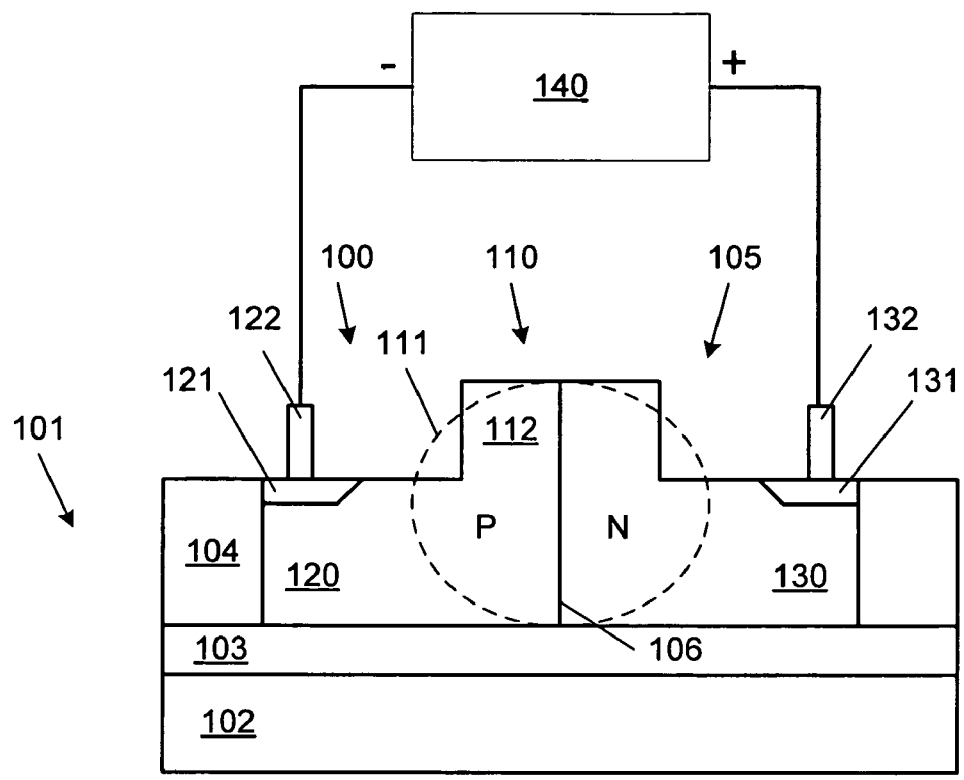
FIG. 1 is a cross sectional diagram of an integrated optical modulator, according to one embodiment of the present invention.

FIG. 1 is a cross sectional diagram, not to scale, of an integrated optical modulator, according to one embodiment of the present invention. Optical modulator 100 is made of lateral PN diode 105 fabricated across waveguide 110 on substrate 101. Substrate 101 in an exemplary embodiment is a SOI (silicon on insulator) substrate, made of silicon layer 104 on top of silicon dioxide layer 103, which is on top of silicon layer 102. Other types of substrates can be used, such as a five layer substrate made of three layers of silicon with two layers of silicon dioxide separating the silicon layers.

PN diode 105 has two doped regions 120 and 130, which are oppositely doped. The two doped regions 120 and 130 meet at PN junction 106. PN junction 106 is approximately in the center of waveguide 110 and in the approximate center of the optical mode, as shown by dashed line 111. Conductive plugs 122 and 132 connect to respective doped regions 120 and 130 via electrical contacts such as respective ohmic contacts 121 and 131. Ohmic contacts 121 and 131 are typically metallic implants and if these metallic implants are placed close to a light propagating region of a waveguide, the metal in the implants can severely attenuate the propagation of light. As a result, ohmic contacts 121 and 131 are placed in their respective doped regions 120 and 130 as far away from the center of waveguide 110 as is practical, in order to minimize the optical insertion loss of waveguide 110.

Waveguide 110 includes layer 104 and rib 112. Silicon layer 104 and rib 112 can be formed at the same time and of the same silicon used to form the silicon body of a transistor, such as a CMOS transistor. Vertical confinement of the optical wave is provided by the index contrast between silicon layer 104 and silicon dioxide layer 103 and a top level dielectric on top of waveguide 110. For the purpose of simplifying the diagram, the various layers of dielectric, such as the top level dielectric, that are typically disposed on top of waveguide 110 and on the sides of rib 112 are not shown.

Rib 112 provides lateral confinement of light propagating through waveguide 110, so that most of the power in the optical wave is in rib 112 of waveguide 110 or within the section of layer 104 beneath rib 112. Dashed line 111 is an approximation of a cross sectional outline for the majority of the power carried by a guided optical mode as it propagates through waveguide 110.

PN diode 105 has two doped regions 120 and 130, which are oppositely doped. The two doped regions 120 and 130 meet at PN junction 106. PN junction 106 is approximately in the center of waveguide 110 and in the approximate center of the optical mode, as shown by dashed line 111. Electrical contacts 122 and 132 connect to respective doped regions 120 and 130 via respective ohmic contacts 121 and 131. Ohmic contacts 121 and 131 are typically metallic implants and if these metallic implants are placed close to a light propagating region of a waveguide, the metal in the implants can severely attenuate the propagation of light. As a result, ohmic contacts 121 and 131 are placed in their respective doped regions 120 and 130 as far away from the center of waveguide 110 as is practical, in order to minimize the optical insertion loss of waveguide 110.

Without any applied voltage, PN diode 105 has a relatively small depletion region centered in the area of PN junction 106. PN diode 0.105 can be forward biased and used as a modulator, but this would result in a low speed and inefficient device. Reverse biasing PN diode 105 increases the size of the depletion region in diode 105, which causes a change in the effective index of refraction of waveguide 110. Changing the effective index of refraction in waveguide 110 causes a phase shift in the light or optical wave propagating through waveguide 110. Reverse biasing PN diode 105 increases the size of the depletion region at a relatively high speed because this phenomenon is dependent upon the drift velocity in semiconductor slab 104. Changing the size of the depletion region in a reverse biased PN diode 105 can be done much more quickly than in a forward biased PN diode, because changing the size of the depletion region in a forward biased PN diode is limited by the relatively slower speed of carrier diffusion in a semiconductor.

Figure 2:
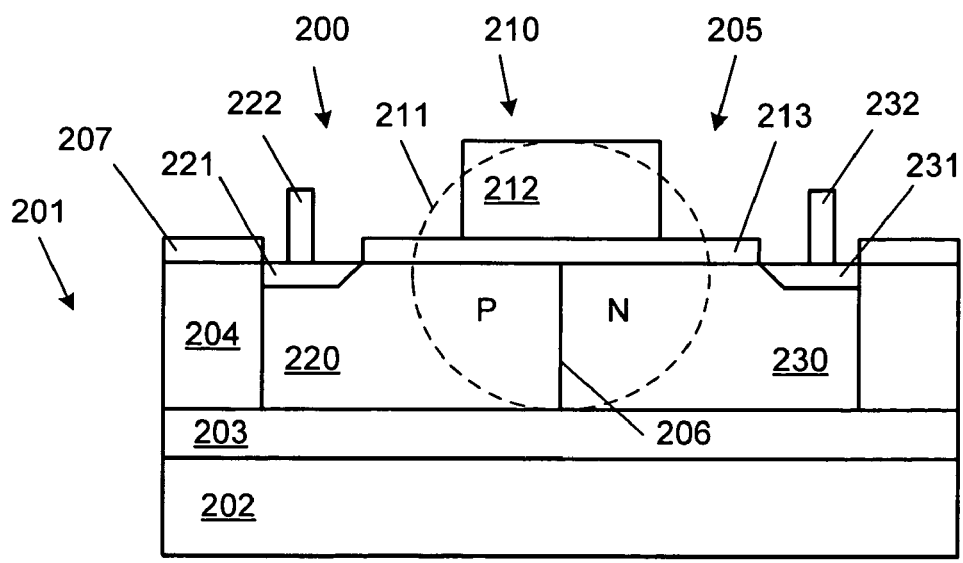
FIG. 2 is a cross sectional diagram of an integrated optical modulator, according to another embodiment of the present invention.

FIG. 2 is a cross sectional diagram, not to scale, of an integrated optical modulator, according to another embodiment of the present invention. Optical modulator 200 is made of lateral PN diode 205 fabricated across strip loaded waveguide 210 on substrate 201. Substrate 201 in an exemplary embodiment is fabricated on a five layer substrate, made of three layers of silicon with two layers of silicon dioxide separating the silicon layers. The bottom three layers are shown in FIG. 2: silicon layer 204 is on top of silicon dioxide layer 203, and layer 203 is on top of silicon layer 202. Other types of substrates, such as the SOI substrate 101 shown in FIG. 1 can also be used.

Waveguide 210 includes silicon layer 204, silicon dioxide layer 213 and silicon strip 212. Silicon layer 204 can be formed at the same time and of the same silicon used to form the silicon body of a transistor, such as a CMOS transistor. Silicon dioxide layer 213 can be formed at the same time and of the same dielectric used to form a dielectric element of a transistor, such as a gate oxide layer for a CMOS transistor. Silicon strip 212 can be formed by etching the top layer of the five layer substrate 201 or it can be formed by depositing silicon on top of silicon dioxide layer 213. Vertical confinement of the optical wave is provided by the index contrast between silicon layer 204 and silicon dioxide layer 203 and a top level dielectric on top of waveguide 210. For the purpose of simplifying the diagram, the various layers of dielectric, such as the top level dielectric, that are typically disposed on top of waveguide 210 and on the sides of strip 212, are not shown.

Strip 212 provides lateral confinement of light propagating through waveguide 210, so that most of the power in the optical wave is in the strip 212 of waveguide 210 or within a section of the silicon layer 204 beneath strip 212. Dashed line 211 is an approximation of a cross sectional outline for the majority of the power carried by an optical mode as it propagates through waveguide 210.

PN diode 205 has two doped regions 220 and 230, which are oppositely doped. The two doped regions meet at PN junction 206. PN junction 206 is approximately in the center of waveguide 210 and in the approximate center of the guided optical mode, as shown by dashed line 211. Conductive plugs 222 and 232 connect to respective doped regions 220 and 230 via electrical contacts such as respective ohmic contacts 221 and 231. Ohmic contacts 221 and 231 are typically metallic implants and if these metallic implants are placed close to a light propagating region of a waveguide, the metal in the implants can severely attenuate the propagation of light. As a result, ohmic contacts 221 and 231 are placed in their respective doped regions 220 and 230 as far away from the center of waveguide 210 as is practical, in order to minimize the optical insertion loss of waveguide 210.

The operation of optical modulator 200 is very similar to the operation of optical modulator 100. Reverse biasing PN diode 205 increases the size of the depletion region in diode 205, which causes a change in the effective index of refraction of waveguide 210. Changing the effective index of refraction of waveguide 210 causes a phase shift in the light or optical wave propagating through waveguide 210. Reverse biasing PN diode 205 creates an electric field across the enlarged depletion region, and this electric field can be controlled at high speeds using the applied voltage. As was discussed with regard to FIG. 1, reverse biasing of PN diode 205 causes a relatively faster change in the size of the depletion region in the diode, as compared to forward biasing PN diode 205.

More information about strip loaded waveguides can be found in U.S. patent application Ser. No. 10/241,384 entitled "Strip loaded Waveguide with Low Index Transition Layer," which is incorporated herein by reference.

Due to differences in fabrication methods, forming strip loaded waveguides with consistent properties for use in PN diode optical modulators is much easier than fabricating similar rib waveguides. Forming the rib portion of a waveguide is typically done with a timed etch process and such a process is inherently difficult to control. Irregularities in the formation of a silicon rib with doped sections can lead to the inconsistent operation of optical modulators formed using such waveguides.

A silicon strip for a strip loaded waveguide can be formed in a controlled manner by etching away the unwanted silicon from a slab of silicon, where the depth of the etch is not determined primarily by time, but by a dielectric boundary under the silicon slab. Even if the strip of a strip loaded waveguide is not completely uniform in characteristics, this has minimal impact on the PN diode, since the strip is not doped and thus has no effect on the electrical operation of the lateral PN diode. As a result of the greater control possible in the production of strip loaded waveguides, it is easier to make lateral PN diode modulators in strip loaded waveguides with consistent properties, as compared to making lateral PN diode modulators in rib waveguides.

Figure 3:
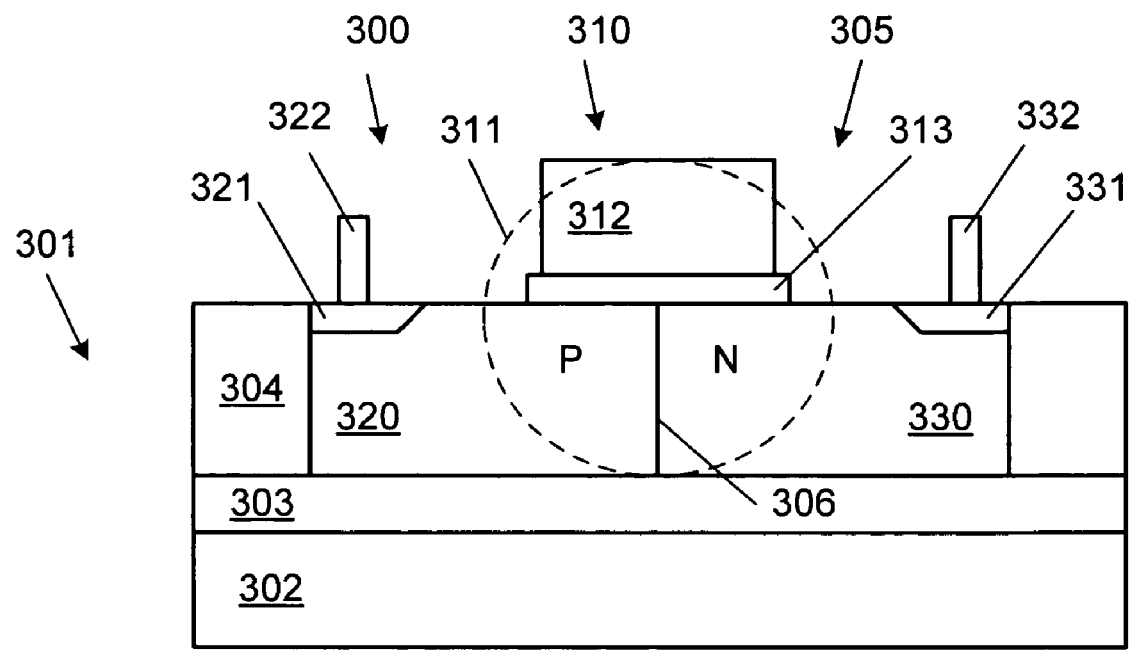
FIG. 3 is a cross sectional diagram of an integrated optical modulator, according to an alternate embodiment of the present invention.

FIG. 3 is a cross sectional diagram, not to scale, of an integrated optical modulator, according to an alternate embodiment of the present invention. Optical modulator 300 is made of lateral PN diode 305 fabricated across strip loaded waveguide 310 on substrate 301. The substrate 301 in FIG. 3 is the same kind of substrate as in FIG. 1 and in an exemplary embodiment is a SOI (silicon on insulator) substrate, made of silicon layer 304 on top of silicon dioxide layer 303, and layer 303 is on top of silicon layer 302. Other types of substrates can be used, such as a five layer substrate made of three layers of silicon with two layers of silicon dioxide separating the silicon layers.

Waveguide 310 includes silicon layer 304, silicon dioxide layer 313 and polysilicon strip 312. Silicon layer 304 can be formed at the same time and of the same silicon used to form the silicon body of a transistor, such as a CMOS transistor. Silicon dioxide layer 313 can be formed at the same time and of the same dielectric used to form a dielectric element of a transistor, such as a gate oxide layer for a CMOS transistor. Polysilicon strip 312 can be formed at the same time and of the same polysilicon used to form a polysilicon element of a transistor, such as a gate for a CMOS transistor. Rib 312 provides lateral confinement of light propagating through waveguide 310, so that most of the power in the optical wave is in the rib 312 of waveguide 310 or within a section of the silicon layer 304 beneath rib 312. Dashed line 311 is an approximation of a cross sectional outline for the majority of the power carried by a guided optical mode as it propagates through waveguide 310. For the purpose of simplifying the diagram, the various layers of dielectric that are typically disposed on top of waveguide 310 and on the sides of rib 312 are not shown.

PN diode 305 has two doped regions 320 and 330, which are oppositely doped. The two doped regions meet at PN junction 306. PN junction 306 is approximately in the center of waveguide 310 and in the approximate center of the optical mode, as shown by dashed line 311. Conductive plugs 322 and 332 connect to respective doped regions 320 and 330 via electrical contacts such as respective ohmic contacts 321 and 331. Ohmic contacts 321 and 331 are typically metallic implants and if these metallic implants are placed close to a light propagating region of a waveguide, the metal in the implants can severely attenuate the propagation of light. As a result, ohmic contacts 321 and 331 are placed in their respective doped regions 320 and 330 as far away from the center of waveguide 310 as is practical, in order to minimize the optical insertion loss of waveguide 310.

The operation of optical modulator 300 is very similar to the operation of optical modulator 100. Reverse biasing PN diode 305 increases the size of the depletion region in diode 305, which causes a change in the effective index of refraction waveguide 310. Changing the effective index of refraction of waveguide 310 causes a phase shift in the light or optical wave propagating through waveguide 310. As was discussed with regard to FIG. 1, reverse biasing of PN diode 305 causes a relatively faster change in the size of the depletion region in the diode, as compared to forward biasing PN diode 305.

Due to differences in fabrication methods, forming strip loaded waveguides with consistent properties for use in PN diode optical modulators is much easier than fabricating similar rib waveguides. Forming the rib portion of a waveguide is typically done with a timed etch process and such a process is inherently difficult to control. Irregularities in the formation of a silicon rib with doped sections can lead to the inconsistent operation of optical modulators formed using such waveguides.

Forming the strip of a polysilicon strip loaded waveguide can be done in a controlled method by deposition of the polysilicon strip. Even if the strip of a strip loaded waveguide is not completely uniform in characteristics, this has minimal impact on the PN diode, since the strip is not doped and thus has no effect on the electrical operation of the lateral PN diode. As a result of the greater control possible in the production of strip loaded waveguides, it is easier to make lateral PN diode modulators in strip loaded waveguides with consistent properties, as compared to making lateral PN diodes modulators in rib waveguides.

Optical modulators of the present invention can be used in a variety of well known configurations, such as Mach-Zehnder Interferometers, ring modulators and Fabry-Perot cavities.

Figure 4:
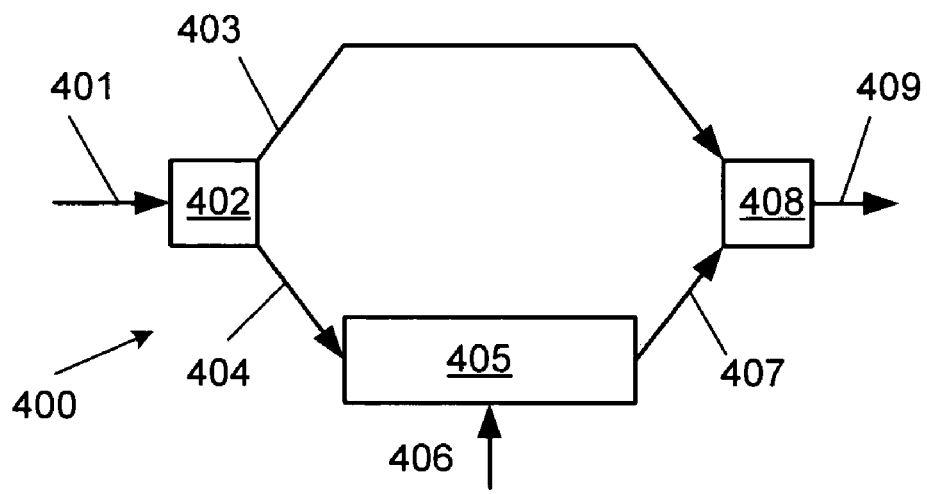
FIG. 4 is an overall block diagram of a Mach-Zehnder Interferometer, incorporating one of the PN modulators of the present invention.

FIG. 4 is an overall block diagram of a Mach-Zender Interferometer (MZI) 400, incorporating any one of the PN diode modulators of the present invention. Optical wave 401 of fixed frequency and amplitude is input to splitter 402, which divides optical wave 401 into two optical waves 403 and 404 of equal amplitude propagating through the two arms of MZI 400. Optical wave 404 is input to PN diode modulator 405, which can cause a phase shift in optical wave 404 and produce optical wave 407 as a result of applied electrical voltage 406. Modulated wave 407 and unmodulated wave 403 are summed in combiner 408 to generate output 409. Depending on the phase relationship between the two waves 403 and 407, combining the two waves can cause constructive or destructive interference, which can result in intensity modulated wave 409. Modulation of optical wave 401 is produced by an electrically controlled phase shift in PN modulator 405.

MZI 400 is one of many well known devices or systems which can be used to modulate an optical wave. Other types of optical modulating systems, which can use any one of the PN diodes of the present invention, include but are not limited to: an MZI modulator with a PN phase modulator in both arms of the MZI, a ring modulator consisting of a waveguide coupled to a ring resonator, where the ring resonator contains a PN phase modulator, a Fabry-Perot (FP) cavity where the PN phase modulator is part of the FP cavity, and an MZI modulator where either one or each of its arms contains one or more of the above ring modulators or FP modulators having a PN phase modulator.

Figure 5:
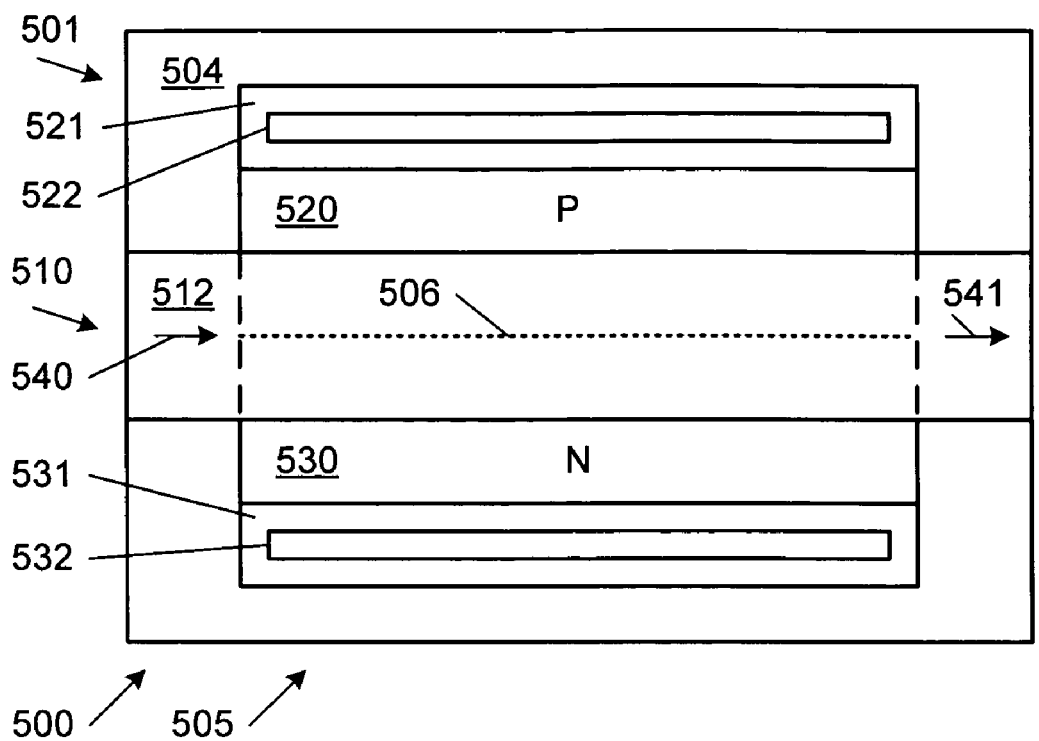
FIG. 5 is a top view diagram of an integrated optical modulators according to one embodiment of the present invention.

FIG. 5 is a top view diagram, not to scale, of an integrated optical modulator, according to one embodiment of the present invention. Optical modulator 500 is made of lateral PN diode 505 fabricated across waveguide 510 on substrate 501. Waveguide 510 includes layer 504 and rib 512. Rib 512 provides lateral confinement of light propagating through waveguide 510, so that most of the power in the optical wave is in rib 512 of waveguide 510 or within the section of layer 504 beneath rib 512.

The various layers of dielectric, such as the top level dielectric, that are typically disposed on top of waveguide 510 and on the sides of rib 512 are not shown in FIG. 5.

Waveguide 510 can be any one of the waveguides of the present invention as shown and described previously with respect to FIGS. 1, 2 or 3. Rib 512 can be made of the silicon rib 112 shown in FIG. 1, or the silicon strip 212 in FIG. 2 or the polysilicon strip 312 in FIG. 3.

PN diode 505 has two doped regions 520 and 530, which are oppositely doped. The two doped regions 520 and 530 meet at PN junction 506. PN junction 506 is approximately in the center of waveguide 510. As previously described with respect to FIGS. 1, 2 and 3, the center of waveguide 510 is also the approximate center of the guided optical mode propagating in waveguide 510. Conductive plugs 522 and 532 connect to respective doped regions 520 and 530 via electrical contacts such as respective ohmic contacts 521 and 531. Ohmic contacts 521 and 531 are typically metallic implants located as far away from the center of waveguide 510 as is practical, in order to minimize the optical insertion loss of waveguide 510.

As discussed previously with regard to FIGS. 1, 2 and 3, reverse biasing PN diode 505 increases the size of the depletion region in diode 505, which causes a change in the effective index of refraction of waveguide 510. Changing the effective index of refraction in waveguide 510 causes a phase shift in the light or optical wave propagating through waveguide 510. Light beam 540 propagating down waveguide 510 enters reverse biased PN diode 505 and can be phase shifted and exit as light beam 541. The amount of phase shifting experienced by light 540 passing through diode 505 will be approximately proportional to the amount of reverse bias applied to diode 505 across electrical contacts 522 and 532.

The shape of PN junction 506 formed at the boundary between doped regions 520 and 530 is approximately that of a plane surface and is roughly perpendicular to the substrate 501. The doping concentration within each of the doped regions can be fabricated to have a step, gradient or other doping profile within each doped region, with for example, more dopant located underneath the metallic ohmic contacts 521 and 531 and less dopant adjacent to PN junction 506. Each of the doped regions 520 and 530 with a gradient doping profile can have more dopant under the ohmic contacts 521 and 531 and less dopant adjacent to the PN junction 506 in the center of the waveguide 210, with a gradual change in concentration between the center and the two ohmic contacts. Placing more dopant in the vicinity of the ohmic contacts provides for a better electrical connection to each of the respective doped regions 520 and 530. Placing less dopant in the area of the PN junction 506 reduces the attenuation of the light propagating through the center of the diode 505 caused by the dopants. The variation in doping concentration from highest under the ohmic contacts 521 and 531 to lowest near PN junction 506 can be gradual or can be stepped with several doped sections within each doped region. In a two-step doping profile, each doped region 520 and 530 could, for example, have two approximately equal sized sections within them. The half of region 520 under ohmic contact 521 can have a relatively higher concentration of dopant and the other half of region 520 next to PN junction 506 can have a relatively lower concentration of dopant. The number and relative size of each of the doped sections within each of the doped regions can be determined by simulation during the design of diode 505 as needed to meet the requirements of a particular use of diode 505.

Figure 6:
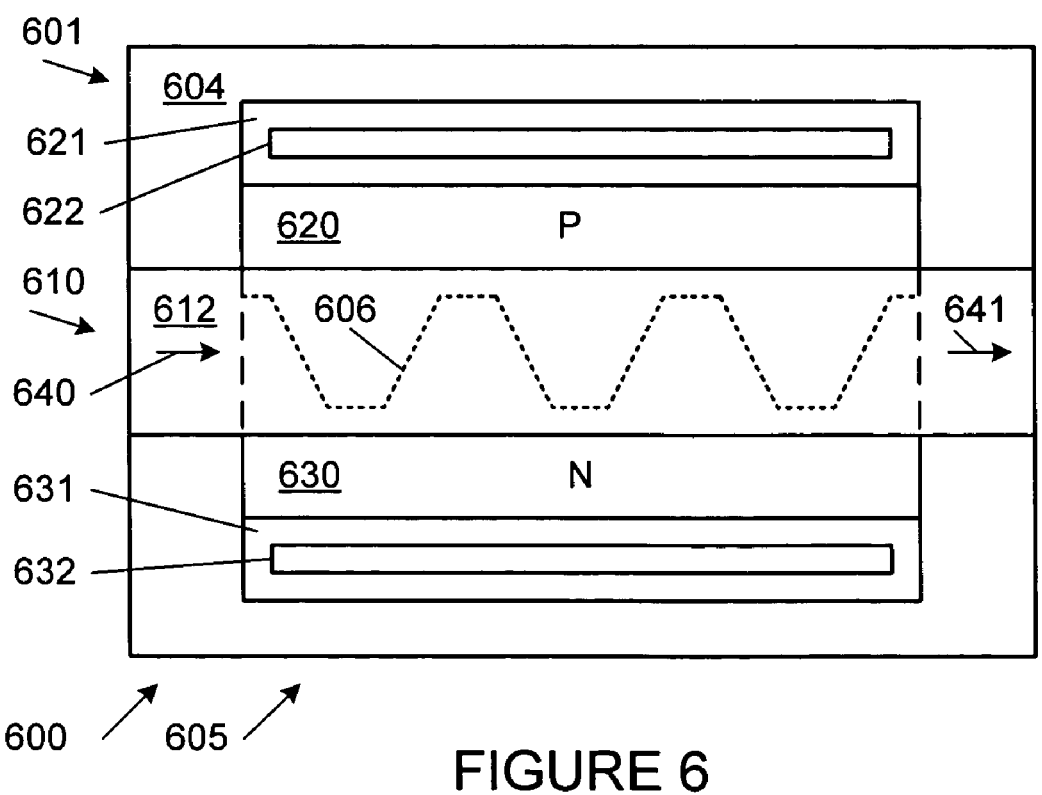
FIG. 6 is a top view diagram of an integrated optical modulator, according to an alternate embodiment of the present invention.

FIG. 6 is a top view diagram, not to scale, of an integrated optical modulator, according to an alternate embodiment of the present invention. Optical modulator 600 is made of lateral PN diode 605 fabricated across waveguide 610 on substrate 601. Waveguide 610 includes layer 604 and rib 612. The structure and operation of modulator 600 is very similar to that of modulator 500, except that PN junction 606 is similar to a sawtooth in shape.

Rib 612 provides lateral confinement of light propagating through waveguide 610, so that most of the power in the optical wave is in rib 612 of waveguide 610 or within the section of layer 604 beneath rib 612. The various layers of dielectric, such as the top level dielectric, that are typically disposed on top of waveguide 610 and on the sides of rib 612 are not shown in FIG. 6.

Waveguide 610 can be any one of the waveguides of the present invention as shown and described previously with respect to FIGS. 1, 2 or 3. Rib 612 can be made of the silicon rib 112 shown in FIG. 1, or the silicon strip 212 in FIG. 2 or the polysilicon strip 312 in FIG. 3.

PN diode 605 has two doped regions 620 and 630, which are oppositely doped. The two doped regions 620 and 630 meet at PN junction 606. PN junction 606 is approximately in the center of waveguide 610. As previously described with respect to FIGS. 1, 2 and 3, the center of waveguide 610 is also the approximate center of the optical mode propagating in waveguide 610. Conductive plugs 622 and 632 connect to respective doped regions 620 and 630 via electrical contacts such as respective ohmic contacts 621 and 631. Ohmic contacts 621 and 631 are typically metallic implants located as far away from the center of waveguide 610 as is practical, in order to minimize the optical insertion loss of waveguide 610.

As discussed previously with regard to FIGS. 1, 2 and 3, reverse biasing PN diode 605 increases the size of the depletion region in diode 605, which causes a change in the effective index of refraction of waveguide 610. Changing the effective index of refraction in waveguide 610 causes a phase shift in the light or optical wave propagating through waveguide 610. Light beam 640 propagating down waveguide 610 enters reverse biased PN diode 605 and can be phase shifted and exit as light beam 641. The amount of phase shifting experienced by light 640 passing through diode 605 will be approximately proportional to the amount of reverse bias applied to diode 605 across electrical contacts 622 and 632.

The shape of PN junction 605 formed at the boundary between doped regions 620 and 630 is not straight, but is variegated and varies in shape along the length of the PN junction, where the doped regions are interleaved or interdigitated with each other. The interleaved sections can vary in size and shape and can take any of a possible number of configurations, such as: periodic, non-periodic, regular or irregular. The main purpose for such a non-planar PN junction structure is to increase the volume of the depletion region per unit length of the PN junction. Increasing the volume of the depletion region can increase the efficiency of modulator 600.

The doping concentration within each of the doped regions can be fabricated to have a stepped or gradient doping profile within each doped region, with for example, more dopant located underneath the metallic ohmic contacts 621 and 631 and less dopant adjacent to PN junction 606. Placing more dopant in the vicinity of the ohmic contacts provides for a better electrical connection to each of the respective doped regions 620 and 630. Placing less dopant in the area of the PN junction 606 reduces the attenuation of the light propagating through the center of the diode 605 caused by the dopants. The variation in doping concentration from highest under the ohmic contacts 621 and 631 to lowest near PN junction 606 can be gradual or can be stepped with several doped sections within each doped region. Each doped region 620 and 630 could, for example, have two approximately equal sized sections within them. The half of region 620 under ohmic contact 621 can have a relatively higher concentration of dopant and the other half of region 620 next to PN junction 606 can have a relatively lower concentration of dopant. The number and relative size of each of the doped sections within each of the doped regions can be determined by simulation during the design of diode 605 as needed to meet the requirements of a particular use of diode 605.

Figure 7:
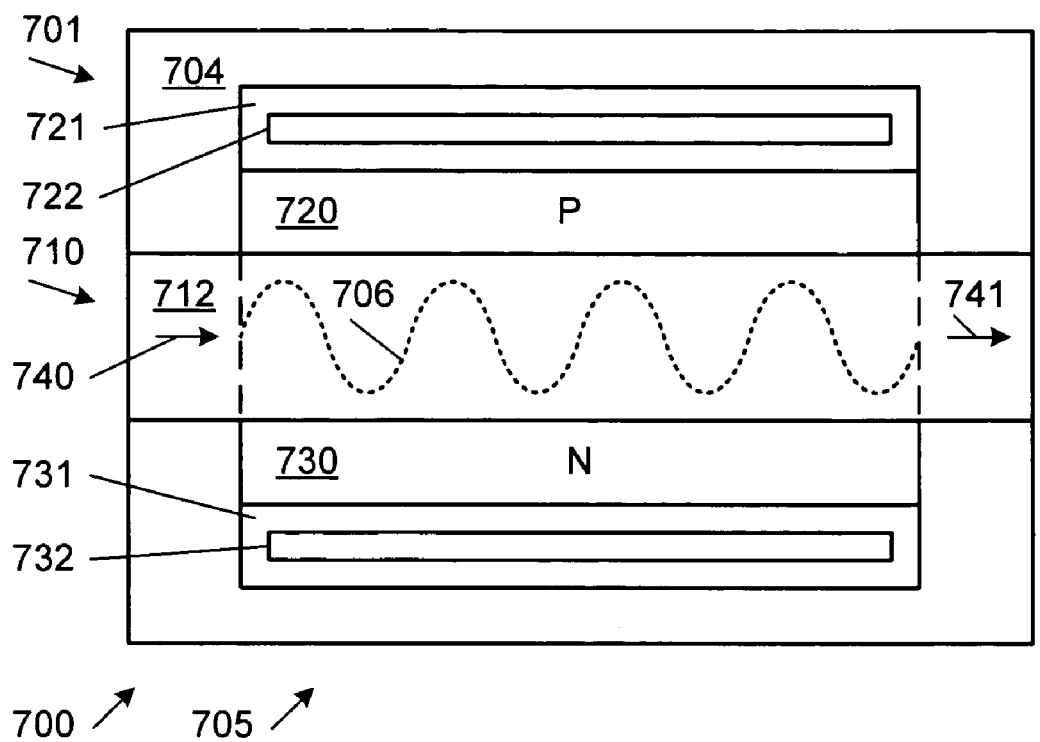
FIG. 7 is a top view diagram of an integrated optical modulator, according to another embodiment of the present invention.

FIG. 7 is a top view diagram, not to scale, of an integrated optical modulator, according to another embodiment of the present invention. Optical modulator 700 is made of lateral PN diode 705 fabricated across waveguide 710 on substrate 701. Waveguide 710 includes layer 704 and rib 712. The structure and operation of modulator 700 is very similar to that of modulator 600, except that PN junction 706 has the shape of a sine wave, which is different from that of the sawtooth shape of PN junction 605 in FIG. 6.

Figure 8:
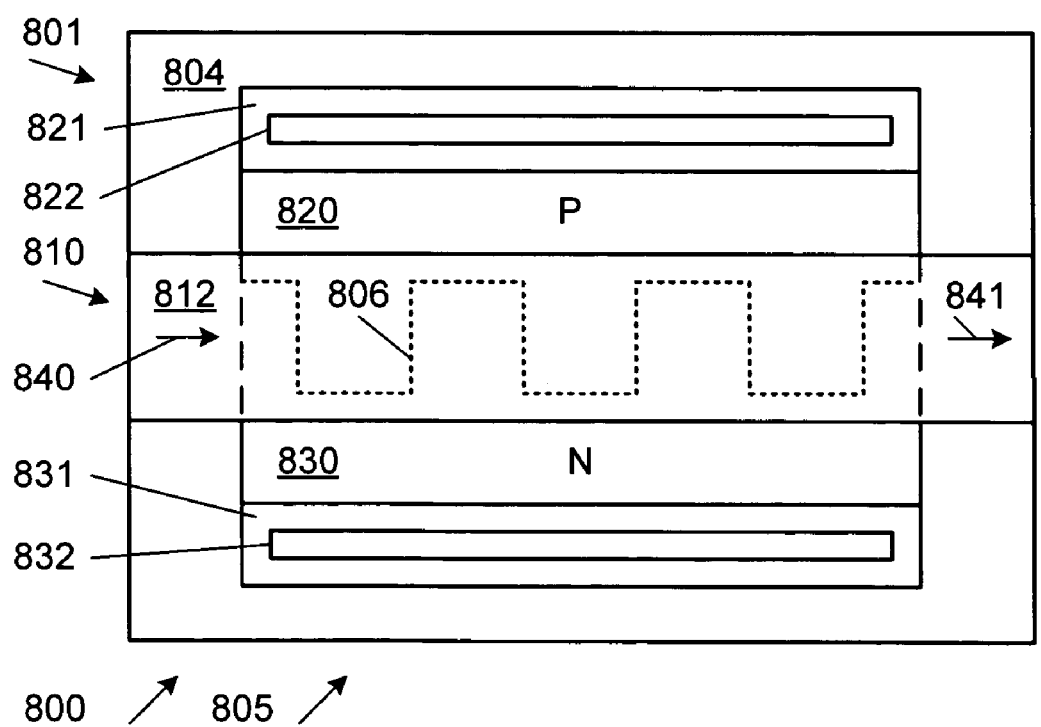
FIG. 8 is a top view diagram of an integrated optical modulator, according to one other embodiment of the present invention.

FIG. 8 is a top view diagram, not to scale, of an integrated optical modulator, according to one other embodiment of the present invention. Optical modulator 800 is made of lateral PN diode 805 fabricated across waveguide 810 on substrate 801. Waveguide 810 includes layer 804 and rib 812. The structure and operation of modulator 800 is very similar to that of modulators 600 and 700, except that PN junction 806 has the shape of a square wave, which is different from that of either the sawtooth shape of PN junction 605 in FIG. 6 or the sine wave shape of PN junction 705 in FIG. 7.

The shape of the exemplary PN junctions formed at the boundary between the doped regions shown in FIGS. 6, 7 and 8 is not straight or planar, but is variegated and varies in shape along the length of the PN junction, and the doped regions are interleaved or interdigitated with each other. Using a variegated PN junction structure increases the volume of the depletion region per unit length of the PN junction. Increasing the volume of the depletion region in lateral PN diode optical modulators can increase the overlap between the depletion region and the center of the optical mode propagating through the waveguide and thus increase the efficiency of such modulators.

Figure 9:
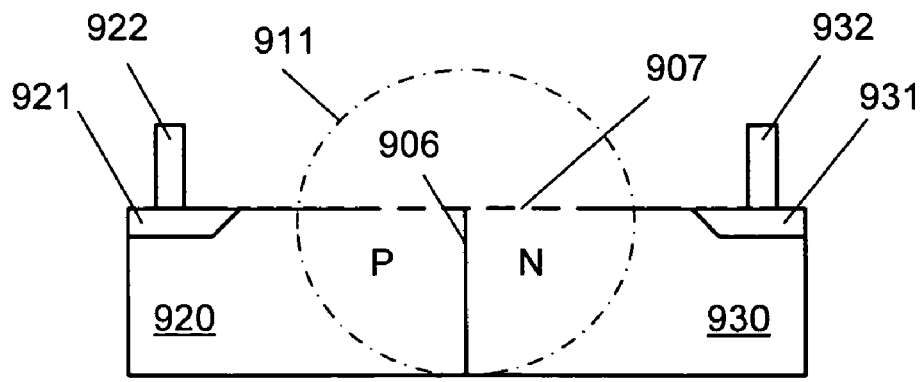
FIG. 9 is a cross sectional diagram of a composite representation of the doped regions of integrated optical modulators, according to several embodiments of the present invention.

FIG. 9 is a cross sectional diagram, not to scale, of a composite representation of the doped regions of integrated optical modulators, according to several embodiments of the present invention. Region 920 is representative of doped regions 120, 220 and 320 of respectively FIGS. 1, 2 and 3. Dashed line 907 represents the upper boundary of the active silicon slab, where the doped regions are formed.

Doped region 930 is representative of doped regions 130, 230 and 330 of respectively FIGS. 1, 2 and 3. Doped regions 920 and 930 of lateral PN diode modulators are oppositely doped and each have a doping gradient within them. One example of possible doping gradients within regions 920 and 930 is shown graphically in FIG. 10.

Ohmic contact 921 is similar to ohmic contacts 121, 221 and 321 of respectively FIGS. 1, 2 and 3. Ohmic contact 931 is similar to ohmic contacts 131, 231 and 331 of respectively FIGS. 1, 2 and 3. PN junction 906 represents the PN junctions 106, 206 and 306 of FIGS. 1, 2 and 3. Guided optical mode 911 is similar to optical modes 111, 211 and 311 propagating through respective waveguides 100, 200 and 300 in respective FIGS. 1, 2 and 3.

The highest concentration of dopants can be next to ohmic contacts 921 and 931, where it is desirable to have as much dopant as possible to provide the best possible electrical connection to the doped regions 920 and 930. The lowest concentration of dopant in each of the regions 920 and 930 can be next to PN junction 906. PN junction 906 is in the approximate center of optical mode 911 propagating through the waveguide of the optical modulator.

Figure 10:
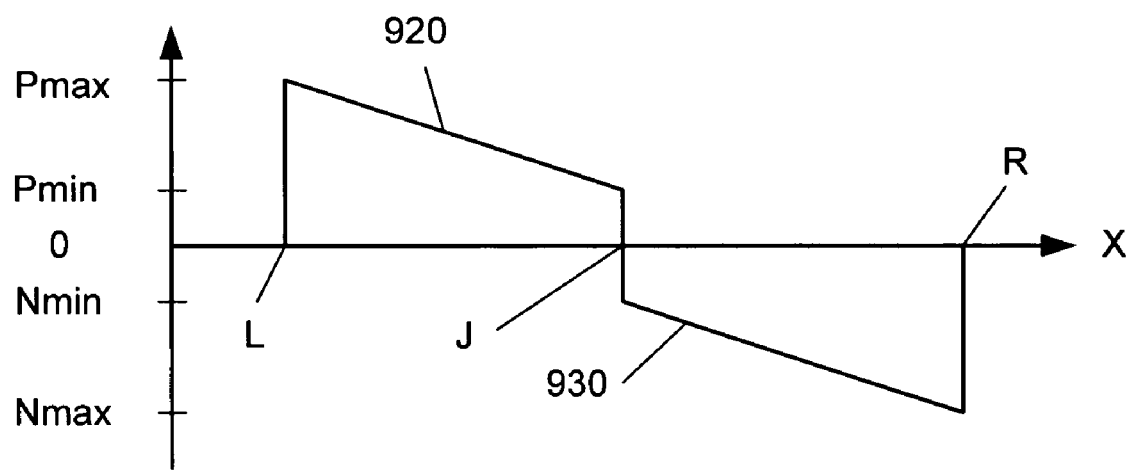
FIG. 10 is an exemplary graph of doping concentration for the doped region shown in FIG. 9, according to one embodiment of the present invention.

FIG. 10 is an exemplary graph of doping concentrations for the doped regions 920 and 930 shown in FIG. 9, according to an embodiment of the present invention. The x axis of FIG. 10 represents the horizontal axis of FIG. 9. The y axis of FIG. 10 is the polarity and net level of dopant concentration in the doped regions of FIG. 9.

Line segment 920 in FIG. 10 illustrates the doping gradient in region 920 of FIG. 9, which represents the doping level in regions 120, 220 and 320 of respectively FIGS. 1, 2 and 3. The concentration of dopant within P doped region 920 of FIG. 9 varies from a high of Pmax at the left boundary of region 920 to a low of Pmin at the right boundary of region 920. The left boundary of region 920 is marked by the L on the x axis of FIG. 10. The right boundary of region 920, which is at the PN junction 906 in the middle of the PN diode, is marked by the J on the x axis of FIG. 10.

Similarly, line segment 930 in FIG. 10 illustrates the doping gradient in region 930 of FIG. 9, which represents the N doping level in regions 130, 230 and 330 of respectively FIGS. 1, 2 and 3. The concentration of dopant in N doped region 930 of FIG. 9 varies from a high of Nmax at the right boundary of region 930, marked by the R on the x axis, to a low of Nmin at the left boundary of region 930 at the PN junction 906, marked by the J on the x axis.

Forming the doped regions of a PN diode modulator with gradient doping profiles can optimize the trade off between the series resistance of the PN diode and the optical loss in the center of the waveguide due to the presence of dopants.

It will be understood by those skilled in the art, that the doping profile in the doped regions in a PN diode modulator can be designed with a profile, which can follow a regular or irregular curve or mathematical function as may be needed for a particular modulator.

Figure 11:
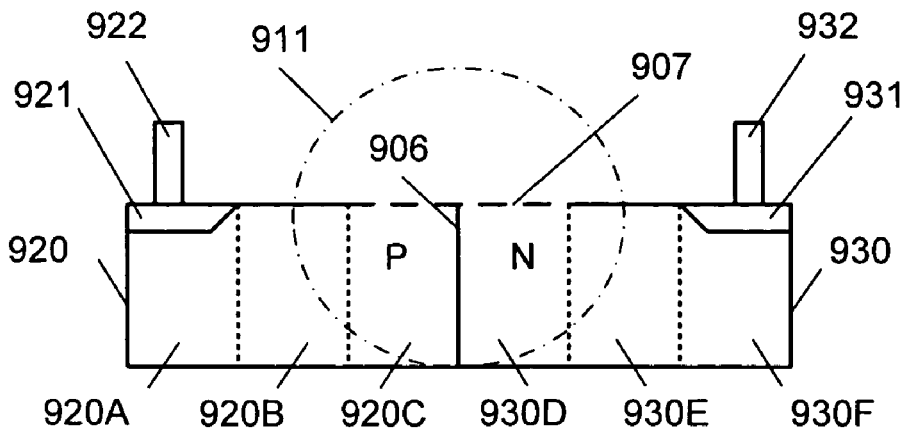
FIG. 11 is a cross sectional diagram of a composite representation of the doped regions of integrated optical modulators, according to several other embodiments of the present invention.

FIG. 11 is a cross sectional diagram, not to scale, of a composite representation of the doped regions of integrated optical modulators, according to several other embodiments of the present invention.

FIG. 11 is very similar to FIG. 9, except for the sections of varying doping concentrations within each of the doped regions 920 and 930. The similarly numbered elements of FIGS. 9 and 11 have the same functions.

Region 920 includes sections 920A, 920B and 920C. Each section within region 920 can have the same polarity of dopant, but with different levels of dopant concentration. Region 930 includes sections 930D, 930E and 930F. Each section within region 930 can have the same polarity of dopant, but with different levels of dopant concentration. One example of possible doping levels within the sections of regions 920 and 930 is shown graphically in FIG. 12.

The number and relative sizes of the sections within each doping region can be chosen, as needed for the design of a particular PN diode optical modulator.

Figure 12:
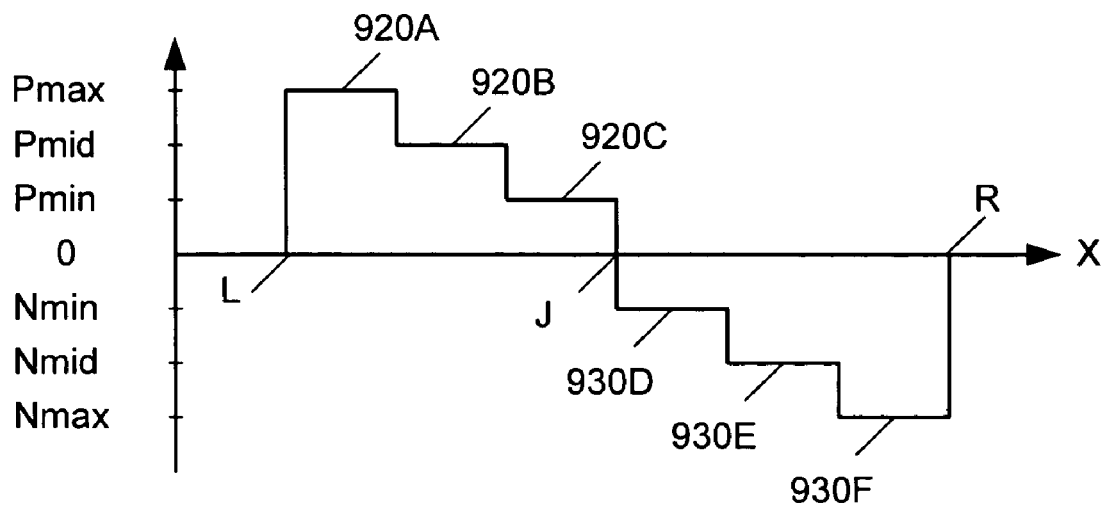
FIG. 12 is an exemplary graph of doping concentration for the doped regions shown in FIG. 11, according to an embodiment of the present invention.

FIG. 12 is an exemplary graph of doping concentration for the doped regions shown in FIG. 11, according to an embodiment of the present invention. The x axis of FIG. 12 represents the horizontal axis of FIG. 11. The y axis of FIG. 12 is the polarity and relative level of dopant concentration in the doped regions of FIG. 11. Point L on the x axis represents the left boundary of region 920 in FIG. 11. Point J on the x axis represents the center of the PN diode in FIG. 11. Point J is the right boundary of region 920 and the left boundary of region 930 in FIG. 11.

In FIG. 12, Pmax, the highest level of P dopimg, is in section 920A. Pmin, the lowest level of P doping, is in section 920C and a mid-level of doping Pmid is in section 920B.

In FIG. 12, Nmax, the highest level of N dopimg, is in section 930F. Nmin, the lowest level of N doping, is in section 930D and a mid-level of doping Nmid is in section 930E.

As can be seen from FIG. 12, the exemplary doping profiles for each doped region are stepped doping profiles. The highest levels of doping are in the sections 920A and 930F, where the ohmic contacts 921 and 931 connect to the respective doped regions 920 and 930. The lowest levels of doping are in the sections 920C and 930D in the center of the PN diodes where the optical mode propagates through the waveguides.

In FIG. 12, the doping levels in the sections 920B and 930E in the middle of the respective doped regions 920 and 930 are between the higher and lower levels in the adjacent sections.

Forming the doped regions of a PN diode modulator with stepped doping profiles can optimize the trade off between the series resistance of the PN diode and the optical loss in the center of the waveguide due to the presence of dopants.

It will be understood by those skilled in the art, that the number of sections in the doped regions of a PN diode modulator can be designed with as few or as many sections as are needed for a particular modulator. Similarly, the doping levels between the sections could be stepped or follow some other distribution of doping levels.

Any of the PN diode modulators of the present invention can also be used in structures or optical processing systems that are not specifically aimed at modulating the light intensity of an optical wave. A PN modulator can be used in various types of optical systems, which provide functions such as: switching, multiplexing/demultiplexing, filtering, tuning and other processing functions. A PN phase modulator can control the phase in one or more arms of an arrayed waveguide grating (AWG). A PN phase modulator can be utilized as the switching mechanism in an optical switch. A PN phase modulator can be used as the phase control mechanism in a laser cavity, which for example can be utilized for wavelength stabilization or tuning. A PN phase modulator can be used in a ring resonator or FP cavity based add/drop filter. A PN phase modulator can provide tuning in a tunable filter, for example, an MZI, ring resonator or FP cavity based filter. A PN phase modulator in a periodically perturbed waveguide, for example a corrugated waveguide, can provide tunable wavelength selectivity. A PN phase modulator in a coupler configuration can control the coupling coefficient, for example, in a multi-mode-interference (MMI) splitter/combiner, Y-junction or directional coupler.

Figure 13:
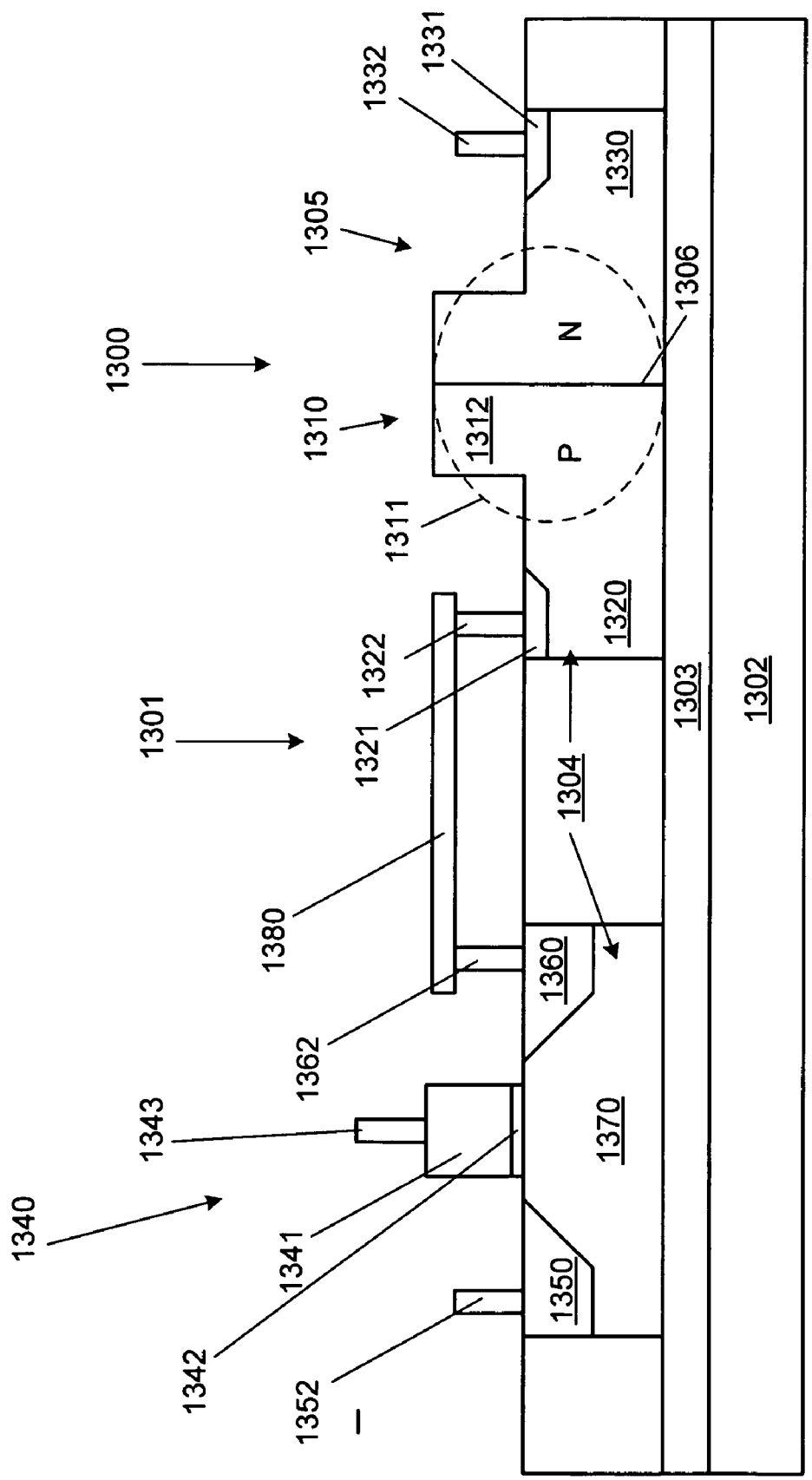
FIG. 13 is a cross-sectional diagram, not to scale, of an integrated optical modulator according to the current invention.

A particularly advantageous aspect of the present invention is the high speed operation of PN diode modulators, especially as compared to the relatively slow operation of forward biased PN diodes and prior art PIN diode modulators. Another particularly advantageous aspect of the present invention is the fabrication of the elements of a PN diode modulator and the elements of a CMOS transistor at the same time and using the same materials on the same substrate, using standard CMOS processing steps. For example, FIG. 13 is a cross-sectional diagram, not to scale, of an integrated optical modulator according to the current invention. In this example, an optical modulator 1300 (comprising elements 1320, 1321, 1322, 1330, 1331 and 1332 taken together) is connected to a CMOS transistor 1340 (comprising elements 1341, 1342, 1343, 1350, 1352, 1370, 1360 and 1362) by a local interconnect 1380. The CMOS transistor 1340 comprises a device built on the same substrate as an optoelectronic device, which is an optical modulator 1300 in this example. The optical modulator 1300, the CMOS transistor 1340 and the local interconnect 1380 are all built on a slab of semiconductor (a silicon layer comprising elements 1320, 1330 1350, 1360 and 1370). In this example, the substrate is a silicon on oxide (SOI) substrate comprising: a slab of semiconductor (a silicon layer comprising elements 1320, 1330 1350, 1360 and 1370) disposed on top of a silicon dioxide layer 1303 which is on top of a silicon layer 1302.

Lateral PN diodes of the present invention can also be fabricated using other semiconductors, such as gallium arsenide and lithium niobate.

Although the present invention has been described in detail, it should be understood that various changes, substitutions and alterations can be made without departing from the spirit and scope of the invention.

We claim:

1. An optoelectronic device on a substrate comprising a silicon waveguide and a lateral PN diode,
    where the lateral PN diode comprises:
        first and second doped regions formed in a slab of semiconductor, where the second doped region is oppositely charged to the first doped region,
        first and second electrical contacts formed in the respective first and second doped regions in the slab of semiconductor,
        where a PN junction is formed at the boundary of the first and second doped regions and the PN junction is substantially in the center of a guided optical mode propagating through the waveguide,
        the concentration of dopant within each of the respective first and second doped regions is not uniform,
        the doping profile within each of the respective first and second doped regions is substantially non-linear,
        the highest concentration of dopant within each of the respective first and second doped regions is substantially adjacent to the first and second electrical contacts, and
        the lowest concentration of dopant within each of the respective first and second doped regions is substantially in the center of an optical mode propagating through the waveguide.

2. The optoelectronic device of claim 1, and further comprising coupling a variable reverse biased voltage source to the PN diode, wherein the propagation properties of a guided optical wave in the waveguide may be modulated by varying an applied reverse bias voltage.

3. The optoelectronic device of claim 1, and further comprising coupling a variable reverse biased voltage source to the PN diode, wherein the size of the depletion region in the PN diode may be changed by varying an applied reverse bias voltage.

4. The optoelectronic device of claim 3, wherein changing the size of the depletion region changes the effective index of refraction of the waveguide.

5. The optoelectronic device of claim 4, wherein changing the effective index of refraction of the waveguide causes a phase shift in a guided optical wave propagating through the waveguide.

6. The optoelectronic device of claim 3, wherein changing the size of the depletion region changes the absorption of a guided optical wave propagating through the waveguide.

7. The optoelectronic device of claim 1, and further comprising the longitudinal propagation of a guided optical wave through substantially the central section of the waveguide,
where the central section of the waveguide guides the substantial majority of the power of the optical wave propagating down the waveguide and
where the first and second electrical contacts are formed not in proximity to a guided optical mode propagating in substantially the central section of the waveguide.

8. The optoelectronic device of claim 1, wherein each of the first and second electrical contacts is comprised of an ohmic contact.

9. The optoelectronic device of claim 1, and further comprising at least one conductive plug coupling each of the first and second electrical contacts to at least one of a plurality of metal layers of an integrated circuit.

10. The optoelectronic device of claim 1, and further comprising at least one local interconnect for coupling an electrical contact on the slab of semiconductor with an electrical contact on a device formed on the substrate.

11. The optoelectronic device of claim 1, wherein at least one of the plurality of electrical contacts is coupled to a device formed on the substrate and where the device is selected from the group comprising: a CMOS transistor, a BiCMOS transistor, a bipolar junction transistor (BJT), a junction FET (JFET) transistor, a diode, a resistor, a capacitor and an inductor.

12. The optoelectronic device of claim 1, and further comprising using the optoelectronic device in an optical processing system.

13. The optoelectronic device of claim 12, wherein the optical processing system is selected from a group comprising: an arrayed waveguide grating (AWG), an optical switch, a laser cavity, a ring resonator based add/drop filter, a Fabry-Perot (FP) cavity based add/drop filter, an MZI based filter, a ring resonator based filter, FP cavity based filter, a periodically perturbed waveguide, a corrugated waveguide, a multi-mode-interference (MMI) splitter/combiner, Y-junction and directional coupler.

14. The optoelectronic device of claim 1, and further comprising using the optoelectronic device in an integrated optical modulation system selected from a group comprising: a Mach-Zehnder Interferometer, a ring modulator and a Fabry-Perot cavity.

15. The optoelectronic device of claim 1, wherein the substrate is selected from a group comprised of:
a substrate comprising:
a layer of silicon dioxide disposed on a layer of monocrystalline silicon,
a layer of sapphire and,
an air filled cavity;
a double silicon on insulator (double SOI) substrate comprising:
a first layer comprised of monocrystalline silicon,
a second layer comprised of silicon dioxide disposed on the first layer,
a third layer comprised of monocrystalline silicon disposed on the second layer, and
a fourth layer comprised of silicon dioxide disposed on the third layer,
a fifth layer comprised of silicon;
a silicon on sapphire (SOS) substrate, and
a silicon on insulator (SOI) substrate.

16. The optoelectronic device of claim 1, wherein the relative concentration of dopant in each of the first and second doped regions substantially follows a doping gradient.

17. The optoelectronic device of claim 1, wherein each of the first and second doped regions comprise a respective first and second plurality of stepped doped sections, where the concentration of dopant in each of the pluralities of doped sections is substantially different from the concentration of dopant in an adjacent one of the pluralities of doped sections in a respective doped region.

18. The optoelectronic device of claim 1, wherein each of the first and second doped regions comprise a respective first and second plurality of doped sections, where the concentration of dopant in each of the pluralities of doped sections is substantially different from the concentration of dopant in an adjacent one of the pluralities of doped sections in a respective doped region.

19. An optoelectronic device on a substrate comprising a silicon waveguide and a lateral PN diode,
where the lateral PN diode comprises:
first and second doped regions formed in a slab of semiconductor, where the second doped region is oppositely charged to the first doped region,
first and second electrical contacts formed in the respective first and second doped regions in the slab of semiconductor,
where a PN junction is formed at the boundary of the first and second doped regions and the PN junction is substantially in the center of a guided optical mode propagating through the waveguide,
the concentration of dopant within each of the respective first and second doped regions is not uniform,
each of the first and second doped regions comprise a respective first and second plurality of stepped doped sections, where the concentration of dopant in each of the pluralities of doped sections is substantially different from the concentration of dopant in an adjacent one of the pluralities of doped sections in a respective doped region,
the highest concentration of dopant within each of the respective first and second doped regions is substantially adjacent to the first and second electrical contacts, and
the lowest concentration of dopant within each of the respective first and second doped regions is substantially in the center of an optical mode propagating through the waveguide.

* * * * *